(12) United States Patent
Dai et al.

(10) Patent No.: US 9,364,856 B2
(45) Date of Patent: Jun. 14, 2016

(54) METHOD OF COATING WORKPIECES

(71) Applicant: ScienBiziP Consulting (Shen Zhen) Co., Ltd., Shenzhen (CN)

(72) Inventors: Feng-Yuen Dai, New Taipei (TW); Jih-Chen Liu, New Taipei (TW); Hung-Lien Yeh, New Taipei (TW); Han-Lung Lee, New Taipei (TW); Shun-Chi Tseng, New Taipei (TW); Hung-Chun Ma, New Taipei (TW)

(73) Assignee: ScienBiziP Consulting(Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/529,990

(22) Filed: Oct. 31, 2014

(65) Prior Publication Data

US 2015/0306627 A1 Oct. 29, 2015

(30) Foreign Application Priority Data

Apr. 23, 2014 (TW) .............................. 103114687 A

(51) Int. Cl.
| | |
|---|---|
| B05C 9/12 | (2006.01) |
| B05C 5/02 | (2006.01) |
| B05D 3/14 | (2006.01) |
| B05D 1/02 | (2006.01) |
| B05D 3/06 | (2006.01) |
| B05C 9/02 | (2006.01) |
| B29C 45/16 | (2006.01) |
| B29C 45/14 | (2006.01) |
| B05C 3/09 | (2006.01) |
| B05C 9/14 | (2006.01) |
| B29C 45/17 | (2006.01) |
| B29C 33/10 | (2006.01) |
| B29C 35/08 | (2006.01) |

(52) U.S. Cl.
CPC . *B05D 3/142* (2013.01); *B05C 9/02* (2013.01); *B05D 1/02* (2013.01); *B05D 3/067* (2013.01); *B29C 45/14* (2013.01); *B29C 45/1671* (2013.01); *B05C 3/09* (2013.01); *B05C 9/14* (2013.01); *B29C 33/10* (2013.01); *B29C 35/0888* (2013.01); *B29C 45/1701* (2013.01); *B29C 2035/0827* (2013.01)

(58) Field of Classification Search
CPC .......... B05C 9/12; B05C 5/0287; B05D 1/02; B05D 3/142; B05D 3/067
See application file for complete search history.

(56) References Cited

U.S. PATENT DOCUMENTS

| | | | | |
|---|---|---|---|---|
| 2003/0211410 | A1* | 11/2003 | Irie ...................... | G03F 7/70525 430/22 |
| 2006/0186576 | A1* | 8/2006 | Takase .................... | B29C 33/68 264/272.11 |
| 2011/0115132 | A1* | 5/2011 | Burdzy ............... | B29C 35/0888 264/478 |
| 2012/0244321 | A1* | 9/2012 | Hsu .......................... | B32B 3/30 428/172 |
| 2012/0251746 | A1* | 10/2012 | Chang ................. | C23C 14/0036 428/34.6 |

* cited by examiner

*Primary Examiner* — Dah-Wei D Yuan
*Assistant Examiner* — Kristen A Dagenais
(74) *Attorney, Agent, or Firm* — ScienBiziP, P.C.

(57) ABSTRACT

A method of coating a workpiece is provided. In the method, a coating device is provided. The coating device includes a transparent covering plate and an ultraviolet light source device. The workpiece is placed in the coating device. Coating material is injected into the coating device to coat the workpiece. The coating material is ultraviolet light curable material. The ultraviolet light source device emits ultraviolet light and the ultraviolet light passes through the transparent covering plate to cure the coating material on the workpiece. The workpiece is taken out of the coating device.

11 Claims, 6 Drawing Sheets

METHOD OF COATING WORKPIECES

FIELD

The subject matter herein generally relates to coating technologies, and particularly to a method of coating workpieces.

BACKGROUND

In coating the enclosures of electric devices, spray guns are generally used to apply spray coating material dissolved in a volatile solvent to the enclosures of the electric devices. However, during coating, 60-70 percent of the coating material evaporates and only 30-40 percent of the coating material is adhered to the enclosures of the electric devices. The evaporating coating material needs to be dissolved in water, to avoid polluting the air.

BRIEF DESCRIPTION OF THE DRAWINGS

Implementations of the present technology will now be described, by way of example only, with reference to the attached figures.

DETAILED DESCRIPTION

Figure 1:
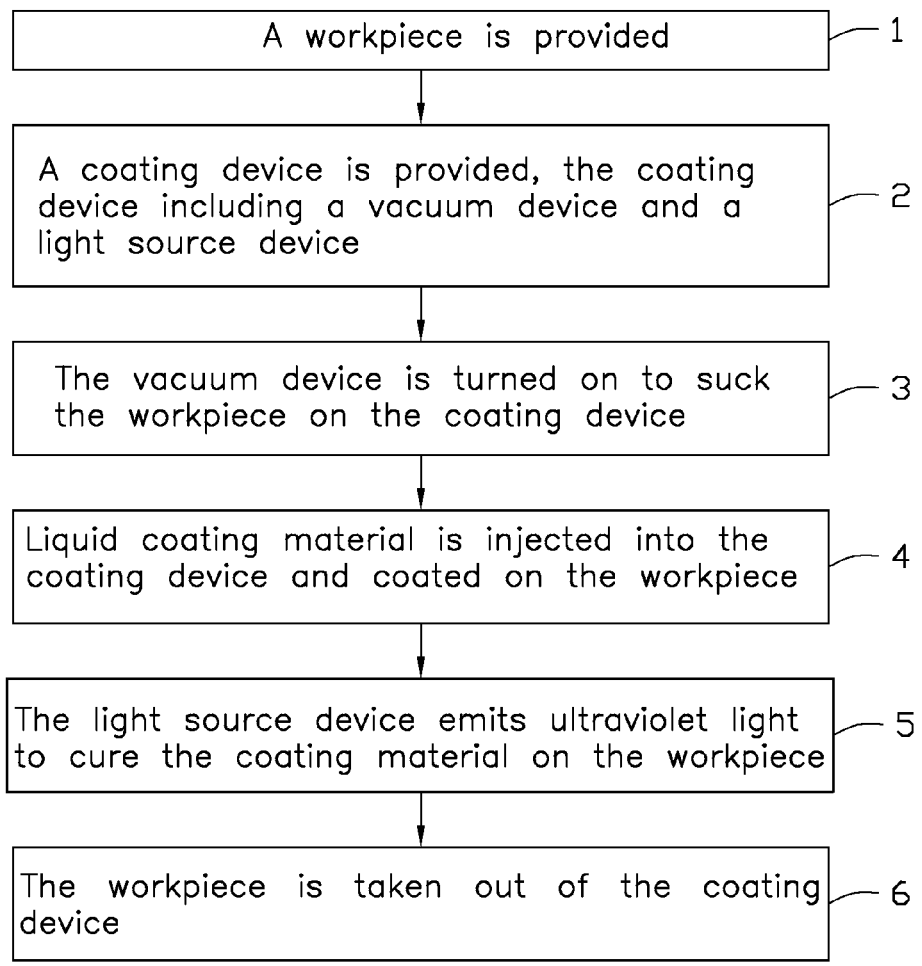
FIG. 1 is a flowchart illustrating a method of coating workpieces according to an embodiment of the instant disclosure.
Figure 2:
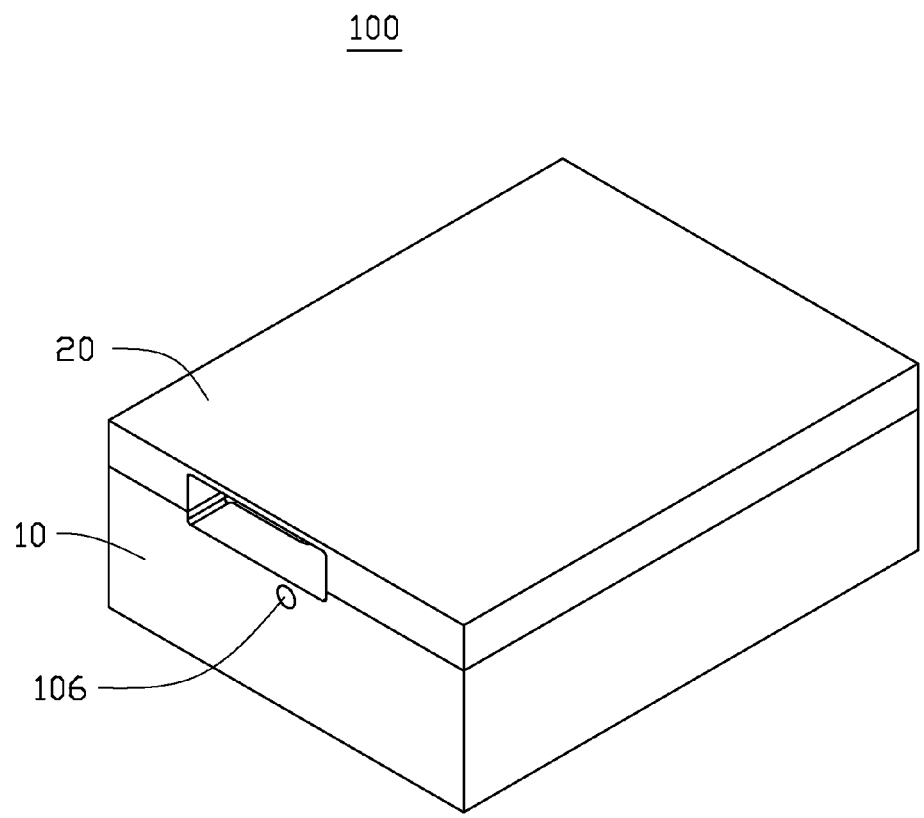
FIG. 2 is a diagram illustrating an embodiment of a coating device applied in the method of FIG. 1.
Figure 3:
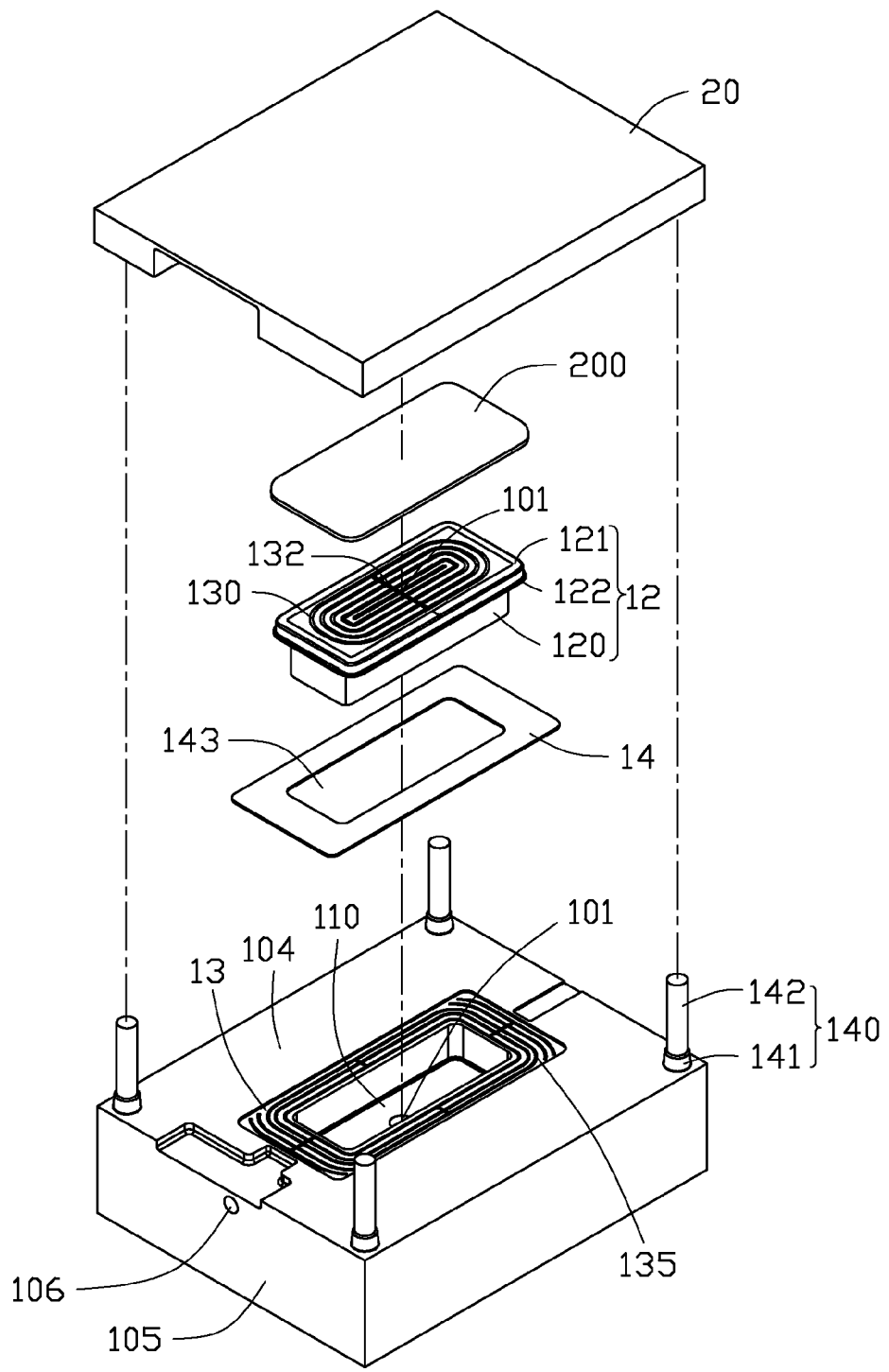
FIG. 3 is an exploded diagram of the coating device of FIG. 2.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Referring to FIG. 1, a method of coating workpieces includes the following:

In block 1, a workpiece is provided.

Figure 4:
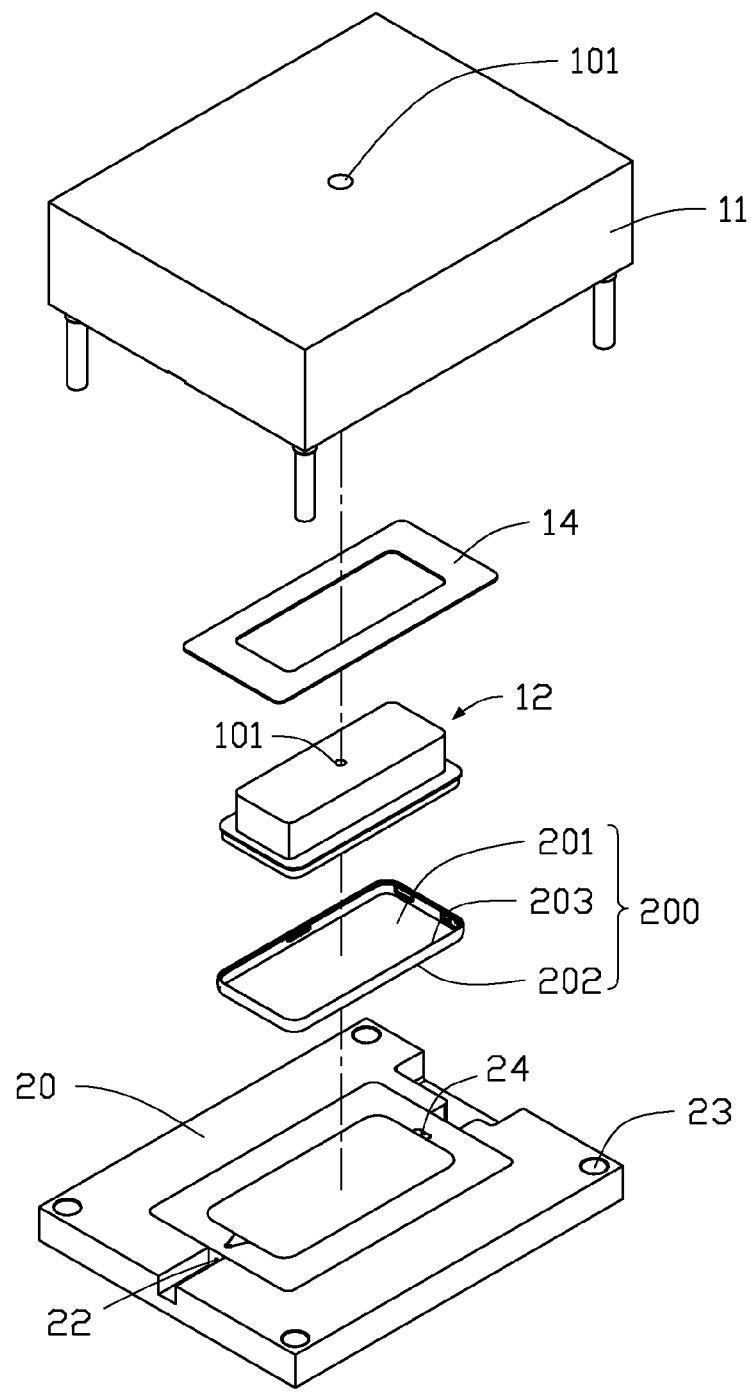
FIG. 4 is similar to FIG. 3, but viewed from another angle.
Figure 5:
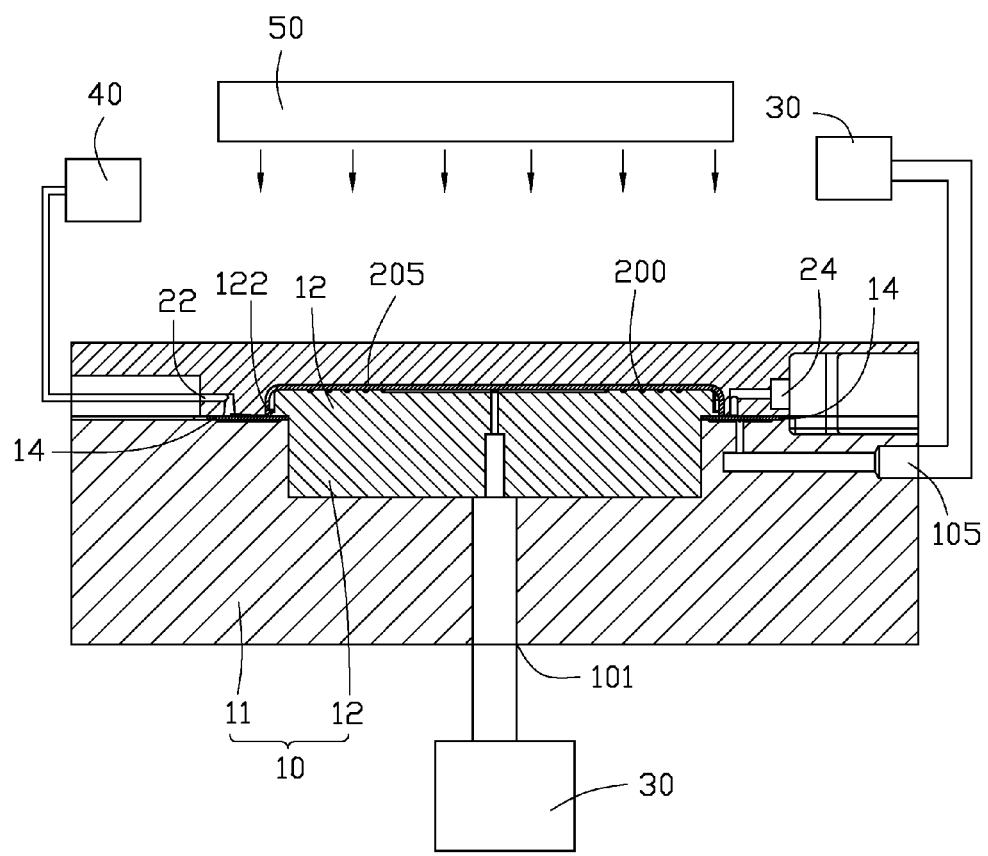
FIG. 5 is a cross-sectional diagram of the coating device of FIG. 2, taken along line V-V.

As shown in FIG. 4, a workpiece 200 is provided. The workpiece 200 includes an inner surface 201, an outer surface 202, and an end surface 203 connecting between the inner surface 201 and the outer surface 202. The inner surface 201 does not need to be coated, while the outer surface 201 and the end surface 203 need to be coated in a coating layer. In one embodiment, the outer surface 202 and the end surface 203 are cleaned by a plasma cleaner, so as to increase the adhesive attraction between the coating layer and the outer surface 202 and the end surface 203.

In block 2, a coating device is provided to hold the workpiece.

As shown in FIGS. 2-5, a coating device 100 is provided. The coating device 100 includes a support 10, a covering plate 20, a vacuum device 30, an injection device 40, and a light source device 50. In coating, the workpiece 200 is positioned on the support 10 and the covering plate 20 covers the support 10. A coating cavity 205 is defined between the covering plate 20 and the outer surface 202 of the workpiece 200.

The support 10 defines a through hole 101. The vacuum device 30 exhausts the air through the though hole 101, so as to suck the workpiece 200 on the support 10. The support 10 includes a base 11 and a support bracket 12. The through hole 101 runs all the way through the base 11 and the support bracket 12.

The base 11 is substantially cubic shaped and includes a top wall 104 and four sidewalls 105 all connected to the top wall 104. The base 11 defines a receiving room 110 in a central portion of the top wall 104. The support bracket 12 is partially received in the receiving room 110. The base 11 also defines a recess 13 communicated with the receiving room 110 and a first suction channel 135 in the bottom of the recess 13. The first suction channel 135 surrounds the receiving room 110 and the recess 13. The base 11 defines a ventilation opening 106 in one of the sidewalls 105. A seal sheet 14 is positioned on the bottom of the recess 13. The seal sheet 14 is made of rubber or silica gel. The ventilation opening 106 is in communication with the vacuum device 30 and the first suction channel 135, so as to suck the seal sheet 14 on the bottom of the recess 13. The seal sheet 14 defines an opening 143.

The support bracket 12 is substantially "T" shaped. The support bracket 12 includes a reduced bottom portion 120, a suction portion 121, and an extension portion 122 connected between the reduced bottom portion 120 and the suction portion 121. The reduced bottom portion 120 is received in the receiving room 110. The suction portion 121 and the extension portion 122 are positioned outside the receiving room 110 and pass through the opening 143. The extension portion 122 is positioned on the seal sheet 14. The suction portion 121 corresponds to the bottom portion of the inner surface 201 in shape and size. The extension portion 122 corresponds to the side portion of the inner surface 201 in shape and size and the gap between the extension portion 122 and the side portion of the inner surface 201 is sealed to prevent the coating material from flowing into the inner surface 201. The suction portion 121 defines a plurality of second annular suction channels 130 and a third suction channel 132. The second annular suction channels 130 have the same center and the third suction channel 132 runs through the center of the second annular suction channels 130. The second annular suction channels 130 and the third suction channel 132 are in communication with the through hole 101. The vacuum device 30 is in communication with the through hole 101 and the workpiece 200 is sucked on the suction portion 121 by the vacuum device 30 through the through hole 101, the second annular suction channels 130, and the third suction channel 132.

The base 11 includes a position adjustment device 140. The position adjustment device 140 includes four positioning poles 141 and four adjustment poles 142. The four positioning poles 141 are positioned at four corners of the top wall 104. Each adjustment pole 142 is received in a respective one of the positioning poles 141 and is capable of sliding in or out of the respective positioning pole 141. The covering plate 20 defines four positioning holes 23 at four corners thereof. The four adjustment poles 142 are received in the four positioning holes 23 correspondingly. The four adjustment poles 142 are capable of being driven to move the covering plate 20 to cover the support 10 or move the covering plate 20 away from the support 10.

The covering plate 20 defines an injection passage 22 and an air channel 24 both communicated with the coating cavity 205. The injection passage 22 and the air channel 24 are each "L" shaped. The injection device 40 is in communication with the injection passage 22. The vacuum device 30 is in communication with the air channel 24.

In this embodiment, the covering plate 20 is made of transparent material. The support 10 is made of transparent material or metal material. The transparent covering plate 20 allows ultraviolet light to pass through, so as to cure the coating material on the outer surface 202 and the end surface 203.

Figure 6:
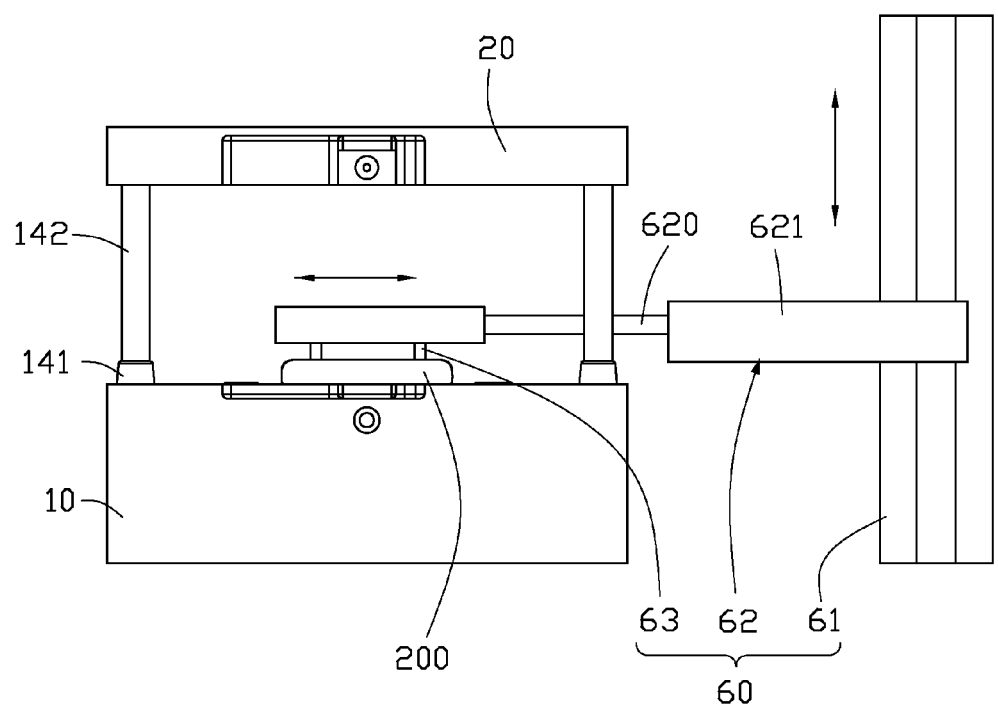
FIG. 6 is a diagram illustrating the coating device of FIG. 2, in use.

In one embodiment, as shown in FIG. 6, a workpiece placing device 60 is provided. The workpiece placing device 60 includes a vertical support unit 61, a horizontal pole 62, and a suction nozzle 63. The horizontal pole 62 is perpendicularly connected to the vertical support unit 61 and is capable of moving along the vertical support unit 61. The suction nozzle 63 is positioned on the horizontal pole 62 and configured to hold the workpiece 200 with vacuum.

The horizontal pole 62 includes a first straight pole 620 and a second straight pipe 621. The first straight pole 620 holds the suction nozzle 63. The first straight pole 620 is capable of sliding in or out of the second straight pipe 621 in a horizontal direction, so as to place the workpiece 200 onto the suction portion 121 for coating or move the workpiece 200 away from the suction portion 121 after coating.

In block 3, the vacuum device 30 is turned on to exhaust air out of the through hole 101, so as to suck the workpiece 200 on the suction portion 121. The vacuum device 30 also exhausts air out of the coating cavity 205 through the air channel 24, so as to prevent bubbles from forming in the coating layer.

In block 4, liquid coating material is injected into the coating cavity 205 by using the injection device 40 through the injection passage 22. The liquid coating material is ultraviolet curable gel.

In block 5, the light source device 50 faces the transparent covering plate 20 and emits ultraviolet light to cure the liquid coating material on the outer surface 202 and the end surface 203.

In block 6, the position adjustment device 140 is adjusted to separate the transparent covering plate 20 from the support 10 and the suction nozzle 63 takes the workpiece 200 away from the suction portion 121.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method of coating a workpiece, comprising:
providing a coating device, the coating device comprising a transparent covering plate and an ultraviolet light source device;
placing the workpiece in the coating device;
injecting coating material into the coating device to coat the workpiece, the coating material being ultraviolet light curable material;
emitting ultraviolet light by using the ultraviolet light source device, the ultraviolet light passing through the transparent covering plate to cure the coating material on the workpiece; and
taking the workpiece out of the coating device;
wherein the coating device comprises a support holding the workpiece, the covering plate and the workpiece cooperatively define a coating cavity, the covering plate defines an injection passage communicated with the coating cavity, the coating material is injected into the coating cavity to coat the workpiece through the injection passage;
the coating device comprises a vacuum device, the support defines a through hole communicated with the coating cavity and the vacuum device, and the vacuum device exhausts the air in the through hole to suck the workpiece on the support;
the support comprises a base and a support bracket, the through hole runs all the way through the base and the support bracket, the base comprises a top wall and four sidewalls all connected to the top wall, the base defines a receiving room in the top wall, the receiving room is in communication with the through hole, the support bracket is partially received in the receiving room, and the support bracket holds the workpiece.

2. The method of claim 1, wherein the base defines a recess in the top wall, the recess surrounds and is communicated with the receiving room, the base defines a first suction channel in a bottom surface of the recess, the first suction channel surrounds the receiving room, the base defines a ventilation opening communicated with the vacuum device and the first suction channel, the base comprises a seal sheet positioned on the bottom surface of the recess and covering the first suction channel, and the vacuum device sucks the seal sheet on the bottom surface of the recess through the ventilation opening and the first suction channel.

3. The method of claim 2, wherein the seal sheet defines an opening, the support bracket is substantially "T" shaped, the support bracket comprises a reduced bottom portion, a suction portion, and an extension portion connected between the reduced bottom portion and the suction portion, the reduced bottom portion is received in the receiving room, the suction portion and the extension portion are positioned outside the receiving room and pass through the opening, and the suction portion holds the workpiece.

4. The method of claim 3, wherein the workpiece comprises an inner surface, an outer surface and an end surface connected between the inner surface and the outer surface, the suction portion touches a bottom portion of the inner surface, the extension portion touches a side portion of the inner surface, a gap between the extension portion and the side portion of the inner surface is sealed to prevent the coating material from flowing into the inner surface, and the extension portion is positioned on the seal sheet.

5. The method of claim 3, wherein the suction portion defines a plurality of second annular suction channels and a third suction channel, the second annular suction channels have the same center, the third suction channel runs through the center of the second annular suction channels, the second annular suction channels and the third suction channel are in communication with the through hole, and the workpiece is sucked on the suction portion by the vacuum device through the through hole, the second annular suction channels, and the third suction channel.

7. The method of claim 3, wherein the base comprises four positioning poles and four adjustment poles, the four positioning poles are positioned at four corners of the top wall, each adjustment pole is received in a respective one of the positioning poles and is capable of sliding in or out of the respective positioning pole, the covering plate defines four positioning holes at four corners thereof, the four adjustment poles are received in the four positioning holes correspondingly, the four adjustment poles are capable of being driven to move the covering plate to cover the support or move the covering plate away from the support.

7. The method of claim 1, wherein the covering plate defines an air channel communicated with the coating cavity, the vacuum device is in communication with the air channel, the coating device comprises an injection device, the injection device is in communication with the injection passage, and the coating material is injected into the coating cavity by the injection device through the injection passage.

8. The method of claim 7, wherein the injection passage and the air channel are each "L" shaped.

9. The method of claim 1, wherein the workpiece is placed in the coating device or taken out of the coating device by using a workpiece placing device, the workpiece placing device comprises a vertical support unit, a horizontal pole, and a suction nozzle, the horizontal pole is perpendicularly connected to the vertical support unit and is capable of moving along the vertical support unit, and the suction nozzle is positioned on the horizontal pole and configured to hold the workpiece with vacuum.

10. The method of claim 9, wherein the horizontal pole comprises a first straight pole and a second straight pipe, the first straight pole holds the suction nozzle, the first straight pole is capable of sliding in or out of the second straight pipe in a horizontal direction, so as to place the workpiece in the coating device or move the workpiece out of the coating device.

11. The method of claim 1, wherein the workpiece is cleaned up by a plasma cleaner before placed in the coating device.

* * * * *